United States Patent [19]
Dotson

[11] 3,863,946
[45] Feb. 4, 1975

[54] TWO-WHEEL FOLDABLE DOLLY

[76] Inventor: Barett O. Dotson, 2830 S.E. Colt Dr., Portland, Oreg. 97202

[22] Filed: Oct. 29, 1973

[21] Appl. No.: 410,924

[52] U.S. Cl............................ 280/36 C, 280/47.27
[51] Int. Cl............................................. B62b 1/10
[58] Field of Search................ 280/36 C, 37, 47.27

[56] References Cited
UNITED STATES PATENTS

| 2,513,526 | 7/1950 | Simonian | 280/36 C |
| 3,177,000 | 4/1965 | Alexander | 280/36 C |
| 3,326,311 | 6/1967 | Jung | 280/36 C |
| 3,659,867 | 5/1972 | Curry | 280/47.27 |

Primary Examiner—Philip Goodman
Assistant Examiner—John A. Carroll
Attorney, Agent, or Firm—Robert K. Rhea

[57] ABSTRACT

A plurality of hingedly connected sections form a planar load receiving surface having a pair of support wheels connected to one end section and a load retaining shoe is hingedly connected to the same end section opposite the load supporting wheels. Locking bar means maintains the hingedly connected sections in load receiving position. Side and end walls, connected with the section opposite the wheels, form a socket permitting opposing end sections to be collapsed or folded to a compact stored position when not in use.

2 Claims, 4 Drawing Figures

PATENTED FEB 4 1975 3,863,946
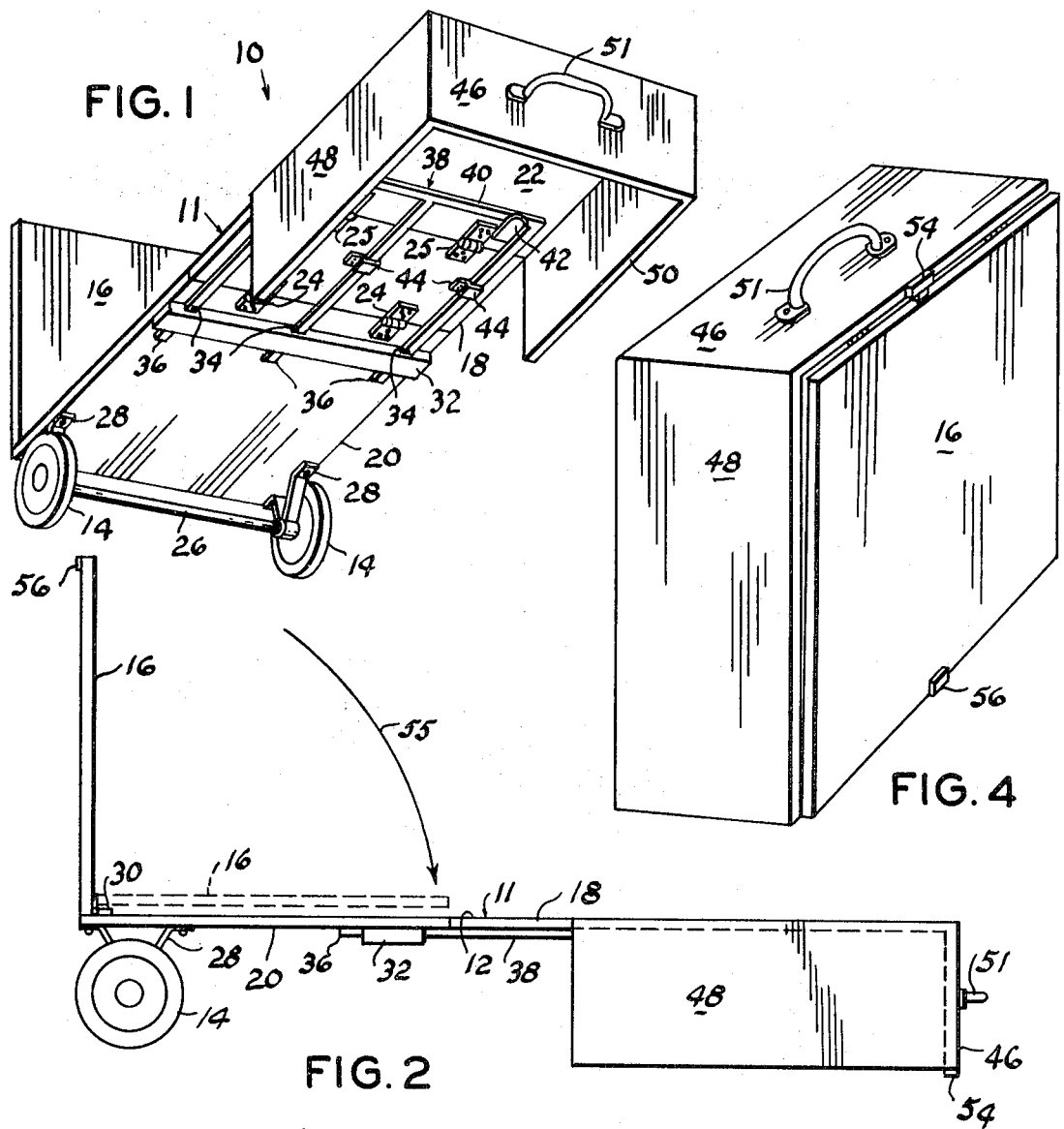
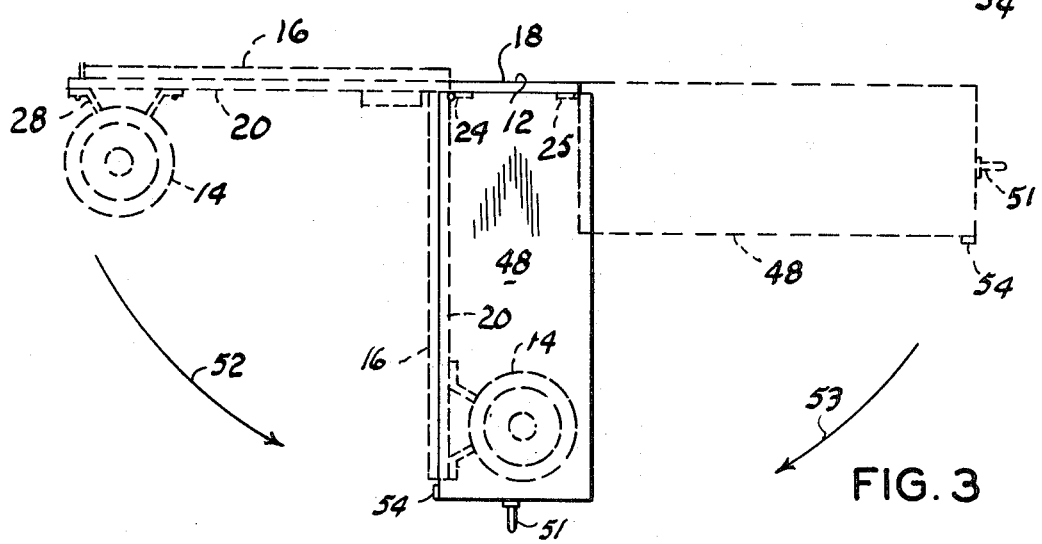

TWO-WHEEL FOLDABLE DOLLY

BACKGROUND OF THE INVENTION

1. Field of the Invention

The present invention relates to two-wheel dollies and more particularly to a foldable luggage transporting two-wheel dolly.

In handling or moving bulky relatively lightweight objects, such as suitcases, and the like, commonly referred to as luggage, at airports, hotels, or railroad stations, it is desirable to have a two-wheel type hand cart or dolly for moving such items.

2. Description of the Prior Art

Movement of luggage, or the like, is presently facilitated by two-wheel type dollies provided with a panel overlying or positioned on the load receiving shoe portion of the dolly for supporting and transporting a plurality of suitcases, and the like, however, such dollies as presently used require an excess amount of storage space when not in use.

This invention provides a two-wheel dolly arranged to be collapsed or folded to occupy a small area of space when not in use.

SUMMARY OF THE INVENTION

A central section and opposing end sections are hingedly connected together at their abutting ends for movement toward and away from a common plane forming a rectangular load receiving platform. Anchor bar means, connected with the sections opposite the load receiving surface, releasably maintain the sections in a common plane. A pair of supporting wheels are connected to one end portion of one end section opposite the load receiving surface. A load retaining shoe is hingedly connected to the end of the wheel connected section opposite the wheels for movement from a plane normal to the load receiving surface toward and away from the load receiving surface. The other end panel is provided with an end and side walls depending in perpendicular relation with respect to the load receiving surface for nesting the wheel equipped end panel when the end sections are pivoted toward each other. Latch means maintains the end sections and load supporting shoe in a collapsed manually transportable position.

The principal object of this invention is to provide a two-wheel type dolly which may be folded to a collapsed position when not in use.

BRIEF DESCRIPTION OF THE DRAWINGS

FIG. 1 is a perspective view of the device in operative position;

FIG. 2 is a side elevational view of FIG. 1 illustrating, by dotted lines, the folded position of the load retaining shoe;

FIG. 3 is a side elevational view illustrating, by dotted lines, the movement of the respective end portions of the device when pivoted to a folded position; and, FIG. 4 is a perspective view of the device in folded position.

DESCRIPTION OF THE PREFERRED EMBODIMENT

Like characters of reference designate like parts in those figures of the drawings in which they occur.

In the drawings:

The reference numeral 10 indicates the device, as a whole, comprising a platform 11 forming a planar load receiving surface 12 supported by a pair of wheels 14 and including a load retaining shoe 16. The platform 11 is formed by a plurality of rectangular planar sections comprising a central section 18 and end sections 20 and 22. The end sections 20 and 22 are connected to the center section by hinges 24 and 25 for movement toward and away from the platform surface 12. The wheels 14 are journalled by an axle 26 which is connected to the surface of the end panel 20 by brackets 28 opposite the platform load receiving surface 12 adjacent the end portion of the end section 20 opposite its connection with the center section. The load receiving shoe 16 is connected by hinges 30 to the end portion of the end section 20 opposite the wheels 14 for movement from a plane normal to the load receiving surface 12 toward and away from the load receiving surface.

An anchor member 32 is transversely secured to the surface of the end section 20 opposite the load receiving surface 12 adjacent but spaced from the position of the hinges 24. The anchor 32 is provided with a plurality of transverse slots 34 which respectively slidably receive one end portion 36 of anchor bar members 38 with the other end portion of the anchor bar members interconnected by a cross bar 40 retained by socket forming clips 42, only one being shown, secured to the end panel 22, thus permitting longitudinal sliding movement of the angle bar members. Longitudinally the length of the anchor bar members is not greater than the length of the end section 22. Additional anchor bar retainers 44 may be connected with the central panel 18 for reinforcing the anchor bar member 32 and clips 42 in maintaining the three sections 18, 20 and 22 in a common plane.

An end wall 46 is connected with the end of the end panel 22 opposite its hinged connection and depends from the load receiving platform surface 12. A pair of side walls 48 and 50 are similarly connected to opposing side edges of the end panel 22 and the respective ends of the end wall 46. The length of the center section 18 is substantially less than the lengths of the end sections 20 and 22. The length of the end panels 20 and 22 are substantially equal. An operating handle 51 is connected to the outer surface of the end wall 46.

OPERATION

For a load handling operation the device has its components positioned, as shown in FIG. 1, wherein luggage, or the like, not shown, may be placed on the platform surface 12 and retained by the shoe 16 so that an operator grasping the handle 51 may transport the load by maintaining its center of gravity above the axis of the axle 26.

When not in use the device 10 is folded to a collapsed position by manually sliding the anchor bar members 38 out of the anchor member slots 34, retainers 44 and clips 42 and then manually pivoting the respective end sections 20 and 22, in the direction of the arrows 52 and 53, toward each other about their hinged connection with the central section 18. A latch 54 maintains the end sections in their collapsed position. Similarly, the load retaining shoe 16 is pivoted, in the direction of the arrow 55, toward the load support surface 12 of the end section 20 and maintained in a collapsed position by latch means 56. The device, when folded, may be carried by the handle 51.

Obviously the invention is susceptible to changes or alterations without defeating its practicability, therefore, I do not wish to be confined to the preferred embodiment shown in the drawings and described herein.

I claim:

1. A foldable dolly, comprising:
   a sectional platform including a center section and opposing end sections forming a plane defining a load receiving surface;
   platform hinges connecting said end sections to said center section for movement toward and away from the plane of the load receiving surface;
   means releasably maintaining said end sections in the plane of the load receiving surface,
   said releaseable means including at least one pair of anchor members secured, respectively, to the surface of each said end section opposite the load receiving surface adjacent the hinged connection with the center section,
   each anchor member of said pair of anchor members forming a slot adjacent the surface of said end sections opposite the load receiving surface and,
   an elongated anchor bar slidable into and out of the anchor member slots,
   the respective end portions of said anchor bar projecting beyond the hinged connection of said center section with said end sections when said anchor bar is disposed within the anchor member slots;
   a pair of platform support wheels connected with one said end section opposite the load receiving surface;
   a load retaining shoe hingely connected by one marginal edge to the end portion of said one end section opposite said platform hinges for movement toward and away from the load receiving surface;
   a pair of side walls coextensive with and respectively connected by one marginal edge to opposing side edges of said end section opposite said shoe,
   the planes of said side walls being normal to and projecting away from the plane of the load receiving surface; and,
   an end wall extending between said side walls at their ends opposite said shoe and being connected, by one marginal side edge with the end of said one end section opposite said shoe,
   said end wall and said side walls forming a socket for nesting the other said end section and said pair of wheels when said end sections are pivoted about their respective hinged connection toward each other and disposed in a plane normal to the load receiving surface of said center section.

2. The dolly according to claim 1 and further including:
   latch means maintaining said other end section within the socket and maintaining said shoe adjacent the load receiving plane of said other end section; and,
   a handle connected with the surface of said end wall opposite said shoe.

\* \* \* \* \*